3,485,599
RAPID IGNITION CHARCOAL BRIQUETTE
Howard Eugene Richardson, 515 McNair Ave., Brookhaven, Miss. 39601, and John A. Hardisty, P.O. Box 222, Hurst, Tex. 76053
No Drawing. Filed May 20, 1968, Ser. No. 730,630
Int. Cl. C10l 5/02, 5/10
U.S. Cl. 44—17                              2 Claims

ABSTRACT OF THE DISCLOSURE

A charcoal briquette is provided having an oxidant agent which imparts to the briquette a quick ignition characteristic for starting and a retarder agent for thereafter controlling the rate of burning to provide for smooth and complete burning of the briquette with a high heat value.

BACKGROUND OF THE INVENTION

Charcoal, especially in compressed form, has for many years been desirably employed in the manufacture of briquettes because of its high kindling temperature. However, such briquettes suffer from the disadvantage that resort must be made to an exterior heat source or charcoal lighter fuels to produce the necessary heat for ignition. Often oxidants and coating materials are incorporated into the charcoal to aid initial starting and ignition thereof. More recent research stemming from the popularity of charcoal briquettes for use as fuel in barbecue and hibachi ovens has resulted in the development of spontaneously combustible charcoal briquettes which can be ignited merely by rubbing on a friction surface. Such briquettes are described in U.S. Patents 3,304,161 and 3,328,137.

In the case of the spontaneously combustible charcoal briquettes ignitable upon exposure to air, the briquettes must be hermetically wrapped. This is a costly process. Still, there is danger of ignition due to accidental tearing or unraveling of a wrapper thus exposing the briquette to air. The dangers of effecting ignition by rubbing are self-evident.

SUMMARY OF THE INVENTION

It is accordingly a primary object of the present invention to provide a reliable, quick starting and smooth burning charcoal briquette having a rapid ignition characterictic and which is capable of smooth and complete burning with a high heat value. Another object of the present invention is to provide a charcoal briquette which may be easily ignited with an initial flare-up without the use of auxiliary fuels, starters and other devices and which flareup rapidly recedes to allow a smooth, controlled long burn.

In accordance with this invention, a briquette formed principally of a mixture of powdered charcoal to which is added an oxidant and a binder in quantities which would normally provide a self-starting charcoal briquette of the type having an extremely rapid ignition characteristic and low heat value. Such a briquette would be totally unsuitable for domestic use. To this mixture is added a retarder agent which prevents the briquettes from igniting spontaneously and from burning too rapidly after ignition. The retarder enables the use of more oxidant than otherwise would be permissable and provides a reliable quick starting and smooth burning charcoal briquette composition.

DESCRIPTION OF THE PREFERRED EMBODIMENT

In the present invention, the composition, which is preferably compressed into briquette form, is composed of a powdered charcoal mixed with a suitable binder and oxidant salt, together with a retarder agent which permits an initial flare-up and thereafter controls the complete burning process to lengthen the burning life of the briquettes. The charcoal mixture is prepared by mixing the charcoal, oxidant, binder and retarder with water to make a heavy paste. The mixture is then run through a hammer mill to form the briquettes in a conventional manner. Thereafter, the briquettes are conveyed to a dryer and maintained therein at a predetermined temperature and for a controlled period.

Various types of charcoals may be employed in accordance with the present invention, although it is preferred to employ a ground hardwood charcoal. A hardwood charcoal of retort grade produces minimum odor while burning. Other types of charcoal, however, such as lignites and kiln charcoal, may also be used.

The oxidant material employed in the briquettes to initiate and sustain combustion is preferably of a type which is non-toxic, as are the other ingredients, so as not to give off any harmful or contaminating gases upon combustion, will easily mix and combine with other ingredients in the formation of the briquettes. Sodium nitrate is preferred because of its ready availability and low cost. The oxidant, in addition to promoting initial flare-up, causes ignition to proceed inwardly throughout the entire briquette. Obviously, uncontrolled excesses of oxidant can reduce the burning life of the briquettes and heat value to such an extent as to render them worthless.

The binder to be used in the briquettes may be any organic binder in solution. A wide range of binders of such binders are commercially available. In the present invention, corn starch is preferred as the binder. The binder serves to bind and tightly adhere the ingredients together during the mixing process and after the briquettes have been compressed into final form. Other suitable binder materials include potato starch, mogul starch and wheat starch.

A primary feature of the present invention resides in the use of a retarder which advantageously enables the use of a greater percentage of oxidant than otherwise would be permissable without destroying the desirable high heat value and long burning process of the briquette which after ignition should be at least 60 minutes and not less than 30 minutes. Advantageously, the retarder preferred is a bentonite. Bentonite is a clay composed principally of aluminum silicates with some magnesium and iron and is readily available commercially.

The proportions in which the various components of the charcoal briquettes are mixed are advantageously substantially as follows: ground charcoal 68 to 74% by weight, oxidant, which may be sodium nitrate, 20 to 22% by weight, binder material 3 to 4% by weight, and retarder material 3 to 4% by weight.

The amount of moisture utilized will preferably be the minimum quantity needed for the purpose of uniformly dispersing the sodium nitrate, binder and retarder with the powdered charcoal in a mixture from which briquettes may be formed in a conventional hammer mill. Generally, the moisture content will not be critical, since after forming the briquettes, the materials are passed through a dryer where the moisture is removed.

Example I

In accordance with the preferred method of forming the briquettes of the present invention, 1000 pounds of charcoal are ground and placed in a mixer or blender. To the finely ground charcoal are added 300 pounds of sodium nitrate, together with 50 pounds of bentonite and 50 pounds of corn starch. The batch or mixture is mixed in a blender and water and steam added in an amount necessary to precook the mixture. The amount of water added is sufficient to permit a thorough blending of the ingredients and product optimum results when tableting the mixture in a press.

After the mixture is prepared in the above-described manner, it is removed from the mixer and placed in a press or conventional tablet-forming apparatus capable of selectively applying high pressure, such as a pressure from 100 to 15,000 pounds per square inch. The physical form of the tablets or briquettes is not critical and they may be round, rectangular, or any other desired shape.

After the briquettes are formed, they are placed into a dryer and maintained therein at a controlled temperature of 220° F. for approximately one hour. The drying proceeds at such a rate that substantially all of the moisture in the briquettes is removed. After one hour of drying at 220° F., the initially dried briquettes are then subjected to an increase in drying temperature up to approximately 240° F. and maintained at this temperature for approximately one hour, after which the temperature is decreased to approximately 220° F. and maintained at that level for another additional two hours. The dried briquettes are then removed from the dryer and placed in a forced air cooling chamber for air cooling to room or atmospheric temperatures. After leaving the cooling area, the briquettes are transported to a hopper and then immediately to a sacking machine where they are packaged into treated containers which prevent moisture contamination.

Example II

In accordance with another method of forming the briquettes of the present invention, 1,000 pounds of ground charcoal were mixed with 300 pounds of sodium nitrate, 50 pounds of refined drilling mud used as a retarder. Water was added in a quantity sufficient to make a heavy paste. The mixture was run through a hammer mill to form briquettes and the briquettes transferred to a dryer which was maintained at a temperature of 240° F. for a period of one hour. The temperature was thereafter gradually decreased over a four hour period to normal room tempeature of approximately 65° F.

One of the important characteristics of the charcoal briquettes formed in the manner described herein is the ease with which it is ignited and the thoroughness of the burning process. By incorporating a bentonite or refined drilling mud as the retarder agent in the briquette, a greater percentage by weight of oxidant salt can be utilized to facilitate flare-up, while still providing the long burning life characteristic desirable in such briquettes.

We claim:

1. A compressed charcoal briquette consisting essentially of, by weight 68 to 74% charcoal, 20 to 22% oxidizing agent, 3 to 4% retarder agent selected from the group consisting of bentonite and drilling mud and 3 to 4% starch binder.

2. A briquette having a quick initial ignition characteristic and thereafter a controlled rate of burning characteristic comprising ground charcoal, an oxidizing agent for imparting to said charcoal said quick ignition characteristic, a retarding agent for imparting to said briquette a burn time after ignition of approximately 30 to 60 minutes, said retarding agent being bentonite, a starch binder for adhering the charcoal, the oxidizing agent and bentonite ingredients together, said ingredients being present in said briquette in the amount, by weight, of 68 to 74% charcoal, 20 to 22% oxidizing agent, 3 to 4% bentonite and 3 to 4% starch.

References Cited

UNITED STATES PATENTS

| 22,410 | 12/1858 | Bradley et al. | 44—17 |
| 2,217,994 | 10/1940 | Rick et al. | 44—16 |
| 3,402,033 | 9/1968 | Starr | 44—17 |

OTHER REFERENCES

| 891 | 3/1873 | Great Britain. |
| 9,136 | 2/1908 | Great Britain. |

DANIEL E. WYMAN, Primary Examiner

C. F. DEES, Assistant Examiner

U.S. Cl. X.R.

44—16, 26